J. A. HEANY.
CLUTCH MECHANISM.
APPLICATION FILED JAN. 24, 1919.
1,423,108.
Patented July 18, 1922.
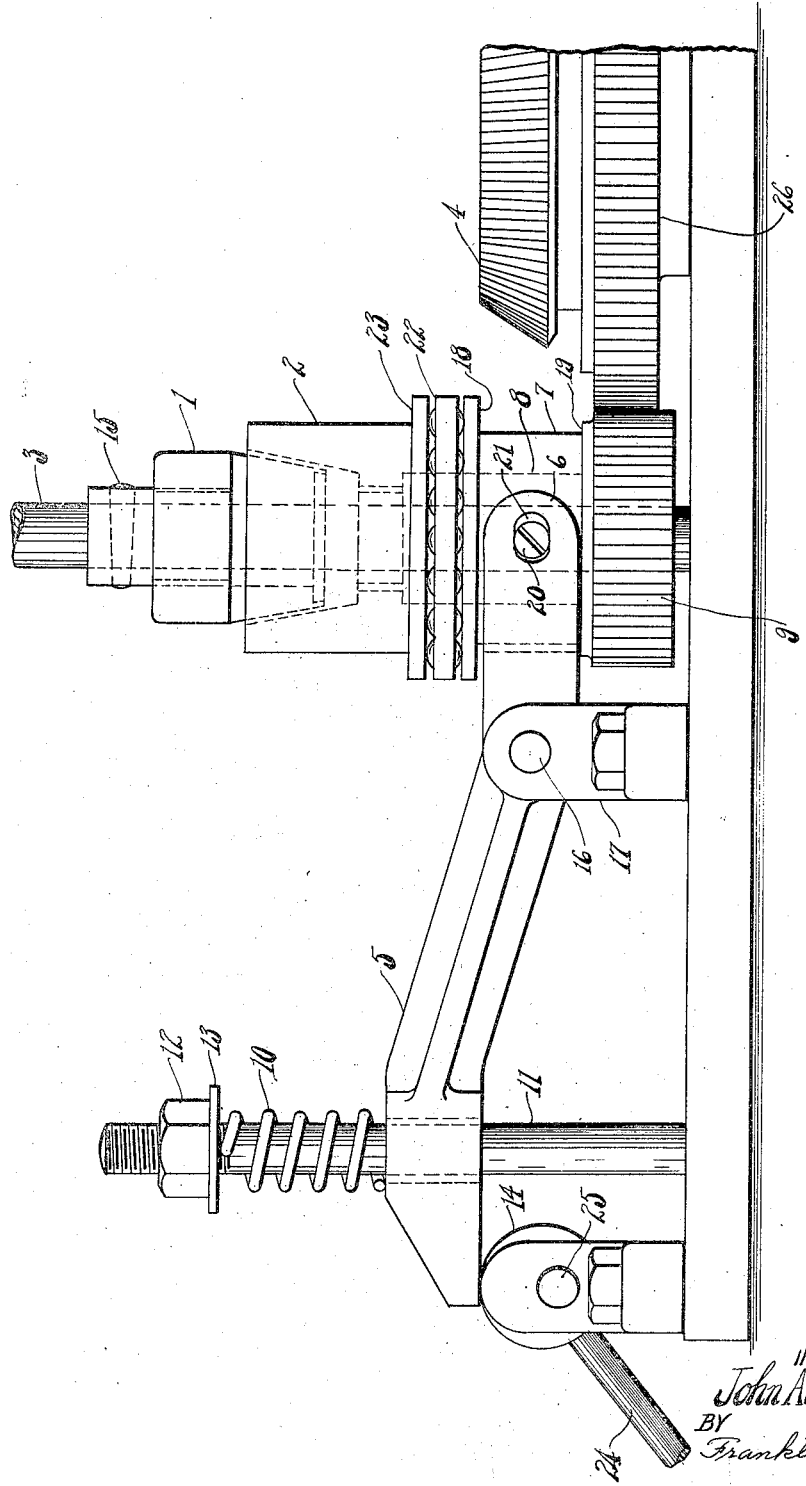
INVENTOR
John Allen Heany
BY
Franklin G. Neal.
ATTORNEY

UNITED STATES PATENT OFFICE.

JOHN ALLEN HEANY, OF NEW HAVEN, CONNECTICUT, ASSIGNOR, BY MESNE ASSIGNMENTS, TO ROCKBESTOS PRODUCTS CORPORATION, A CORPORATION OF DELAWARE.

CLUTCH MECHANISM.

1,423,108.   Specification of Letters Patent.   Patented July 18, 1922.

Application filed January 24, 1919. Serial No. 272,870.

*To all whom it may concern:*

Be it known that I, JOHN ALLEN HEANY, a citizen of the United States of America, residing at New Haven, in the county of New Haven and State of Connecticut, have invented certain new and useful Improvements in Clutch Mechanism, of which the following is a specification.

This invention relates to starting and stopping mechanisms of the friction clutch type.

It is the usual practice where friction clutches are employed in bringing about the engagement of the drive members to make use of a force greatly in excess of that actually required to transmit the required torque from the driving to the driven members. In cases where the machines in which the clutches are used are designed for heavy and comparatively coarse work, or where it is necessary to bring about a substantially instantaneous engagement of the clutch parts in order to keep a machine operation properly timed in relation to other operations of the same machine, there is no serious objection to the use of a clutch operating means which exerts a greater degree of force than is actually required for the purpose. However, in the case of machines designed for lighter and more particular work in which the timing of a series of operations is not involved, or for work on fine and delicate materials, it is essential that the clutch parts be brought into engagement in a gradual and carefully regulated manner so as to bring about an extremely gradual acceleration of the speed of rotation of the driven member from a condition of rest to its normal operating speed.

With the object in view of producing a clutch mechanism in which the required gradual application of turning force is effected, I have provided a friction clutch mechanism in which the parts are brought into operative engagement by the action of a spring that, instead of being mounted in an inaccessible situation encircling the driving shaft, is placed in operative engagement with the end of an operating lever in a position where it is readily accessible for adjustment and regulation. In order to bring about a more perfect regulation of the action of the spring and prevent the exertion of an excessive force thereby, I preferably partially counterbalance the force of the spring by the weight of the movable parts of the clutch mechanism. I have discovered that the application of force by the spring to bring the parts into engagement can be much better regulated and controlled if a portion of the force of the spring is nullified in some such way as I have indicated; and, in order to accomplish this, I preferably utilize the action of gravity as it becomes available when a vertical arrangement of the driving shaft is employed. This feature, coupled with the location of the actuating spring at a point removed from the immediate vicinity of the clutch parts where it is easily accessible for adjustment and regulation and, at the same time, located in a position to effectively cooperate with the clutch parts through the agency of the interposed lever, provides for an easily regulated and graduated application of force to the actuating member of the clutch mechanism.

In the drawing, a preferred embodiment of the invention is illustrated in side elevation.

The clutch members 1 and 2 are of the friction cone type and are mounted on the vertical driven shaft 3 to which power can be transmitted, through the agency of the clutch members, from the bevel gear 4, which is driven from the main source of power in any suitable manner. The driving clutch member 2 is movable longitudinally of the driven shaft 3 into and out of engagement with the driven clutch member 1 and is actuated for this purpose by a controlling lever 5 having a forked end 6 arranged to span a sleeve 7 rotatably mounted on an inner sleeve 8 connecting the clutch member 2 and toothed gear 9. An actuating spring 10 mounted on a bolt 11, between the lever 5 and washer 13, bears against and depresses the outer end of the lever 5 when the manually operable cam member 14 is turned to the proper position to permit of this, to thereby elevate the forked end 6 of the lever 5 and move the clutch member 2 into engagement with the clutch member 1 and rotate the driven shaft 3, by reason of the fixed relation which the clutch member 1 bears to the shaft through the keyed connection at 15.

It is in the relation that exists between the actuating spring 10, the controlling lever 5, and the longitudinally movable clutch member 2 that the invention resides, and it will be seen that the weight of the clutch 2 acts to oppose the action of the spring 10. Advantage is taken of this to procure an action of the spring 10 in which only so much force is exerted as is needed for the purpose, and in which the exertion of excessive force that would tend to produce a harsh and abrupt starting of the driven shaft into rotation is avoided. It will be seen that, by the employment of the weight of the clutch member 2 and the parts connected thereto to partially counterbalance the force of the spring 10, the force exerted by the spring can be so adjusted by means of the nut 12 that only sufficient force is exerted by the spring over and above the force necessary to balance the weight on the forked end of the lever 5 to bring the clutch members into a gradual engagement that will start the driven shaft 3 into rotation with a gradual and uniform acceleration of speed.

It will be seen that the controlling lever 5 is pivoted at 16 on a suitable standard 17 and that the members of the forked end 6 of the lever fit between suitable flanges 18 and 19 on the sleeve 7. To afford an additional securing means for attaching the lever 5 to the sleeve 7 and prevent rotation of the sleeve, screws 20 are provided in the sleeve 7 which extend into longitudinal slots 21 in the ends 6 of the lever, the slots providing for the play required by the movement of the corresponding lever end through an arc about the center 16.

Preferably a ball-bearing 22 is provided between a flange 23 on the clutch member 2 and the upper flange 18 on the sleeve 7. It will be seen that the bearing 22 serves as a thrust bearing for the driven-shaft 3 and provides for ready relative rotation between the clutch member 2 and the sleeve 7 so that rotation of the sleeve 7 between the members of the forked end 6 of the lever 5 may be avoided.

In the operation of the clutch described, the hand lever 24 is manipulated to bring about a rotation of the cam member 14 about its pivot 25 which will either elevate the corresponding end of the lever 5, as shown in the drawing, or permit the outer end of the lever 5 to be depressed by the action of the spring 10, thereby elevating the forked end 6 of the lever 5 and raising the clutch member 2 into driving engagement with the driven member 1. It will be seen that the toothed gear 9, together with the inner sleeve 8, and the clutch member 2 are constantly rotating on the lower end of the driven shaft 3, and that the gear 9 has an intermeshing and slidable engagement with the driving gear 26 which is rigidly connected to the bevel gear 4, previously referred to.

What I claim is—

1. A friction clutch mechanism comprising: a vertical driven shaft, a cone clutch member attached to said shaft, a cone clutch member rotatably mounted on said shaft below said clutch member attached to said shaft, means for rotating said rotatably mounted clutch member, a sleeve on said shaft beneath said rotatably mounted clutch member for moving said clutch member vertically into and out of engagement with said clutch member attached to said shaft, a ball bearing device between the top of said sleeve and said rotatably mounted clutch member, a horizontally pivoted lever extending away from said shaft and arranged to actuate said sleeve, a spring arranged to bear downwardly on the outer end of said lever to thereby tend to raise the rotatably mounted clutch member into engagement with the clutch member attached to said shaft, and a manually operable cam member arranged to engage the outer end of said lever for moving the lever against the action of said spring to clutch-disengaging position.

2. A friction clutch mechanism comprising: a driven clutch member, a driving clutch member, a vertical driven shaft encircled by said clutch members, a driving gear, a gear carried by said driving clutch member having intermeshing and sliding engagement with said driving gear, a horizontally pivoted lever extending to a distance from said driving clutch member and arranged to move the driving member vertically into and out of engagement with the driven member, a spring mounted over the outer end of the lever and arranged to act downwardly thereon to thereby raise the other end of said lever and said driving clutch member against the action of gravity into engagement with said driven member, said spring having a readily accessible regulating means at the upper end thereof, and a manually operable cam member mounted underneath the outer end of the lever and arranged to actuate the lever against the action of said spring to clutch-disengaging position.

JOHN ALLEN HEANY.